(12) United States Patent
Subbiah et al.

(10) Patent No.: US 8,554,760 B2
(45) Date of Patent: Oct. 8, 2013

(54) SYSTEM AND METHOD FOR OPTIMIZING QUERIES

(75) Inventors: Suresh Subbiah, Plano, TX (US); Lars Fredriksen, Downers Grove, IL (US); Murali Mallela Krishna, Vancouver, WA (US); Hansjorg Zeller, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 514 days.

(21) Appl. No.: 12/574,911

(22) Filed: Oct. 7, 2009

(65) Prior Publication Data
US 2011/0082856 A1    Apr. 7, 2011

(51) Int. Cl.
*G06F 17/30*    (2006.01)
(52) U.S. Cl.
USPC .......................................... 707/713; 707/714
(58) Field of Classification Search
USPC .................... 707/713, 714, 999.002
See application file for complete search history.

(56) References Cited

U.S. PATENT DOCUMENTS

| | | | | |
|---|---|---|---|---|
| 5,412,804 | A * | 5/1995 | Krishna | 1/1 |
| 6,560,595 | B1 * | 5/2003 | Sanders et al. | 1/1 |
| 6,604,102 | B2 | 8/2003 | Klein | |
| 7,174,382 | B2 | 2/2007 | Ramanathan | |
| 7,275,056 | B2 * | 9/2007 | Cheng et al. | 1/1 |
| 2006/0074635 | A1 | 4/2006 | Gilbert | |

OTHER PUBLICATIONS

Muralikrishna; "Improved Unnesting Algorithms for Join Aggregate SQL Queries" for Proceedings of the 18$^{th}$ VLDB Conference; 1992; pp. 91-102.*
Steenhagen et al.; "Optimization of Nested Queries in a Complex Object Model" for Proc. of the Int. Conf. on Extending Database Technology (EDBT); 1994; pp. 1-14.*
Kim, Won, "On Optimizing an SQLike Nested Query," ACM Transactions on Database Systems (TODS), vol. 7 No. 3, pp. 443-469, Sep. 1982, Available at http://dspace.ucalgary.ca/bitstream/1880/46295/2/1988-304-16.pdf (last accessed on Mar. 5, 2010).
Muralikrishna, M., "Improved Unnesting Algorithms for Join Aggregate SQL Queries," Proceedings of the 18th International Conference on Very Large Data Bases, British Columbia, Canada Aug. 23-27, 1992, pp. 91-102.
Brantner, Matthias, et al., "Unnesting Scalar SQL Queries in the Presence of Disjunction," Proceedings of the 23rd International Conference on Data Engineering, Apr. 15-20, 2007 in Istanbul, Turkey, pp. 46-55.

* cited by examiner

*Primary Examiner* — Monica Pyo (57) ABSTRACT

There is provided a computer-implemented method of optimizing a query. An exemplary method comprises receiving a first query configured to generate a result set. The query may comprise an operation for an outer table, a first predicate, and a second predicate. The second predicate may comprise a subquery correlated to the operation. Additionally, the first predicate and the second predicate may be disjunctive. The exemplary method also comprises generating a first query tree representing the first query, and generating a second query tree representing a second query. The second query may be configured to generate the result set, and may not comprise the subquery. The exemplary method additionally comprises generating a query plan based on the second query tree.

18 Claims, 7 Drawing Sheets

SYSTEM AND METHOD FOR OPTIMIZING QUERIES

BACKGROUND

Database management systems (DBMSs) are typically used in a Business Intelligence (BI) environment. The BI environment may enable business users to derive data that may be used to inform decisions about the business. For example, a typical BI query may derive data about the company's sales in a particular region. Using the sales data, the company may make decisions about staffing to increase sales in that region.

In a typical BI environment, a relational query language, such as SQL may be used to query business data. Such queries typically involve correlated subqueries, which may incur negative performance implications for the DBMS.

One way of executing correlated subqueries may be to determine a set of qualifying rows in an inner table for each row in an outer table. An aggregate of the inner table may then be computed over the rows selected from the inner table and a predicate may be applied. In this manner, the rows from the inner table may be repeatedly accessed for each row in the outer table, which may lead to long execution times.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1A:
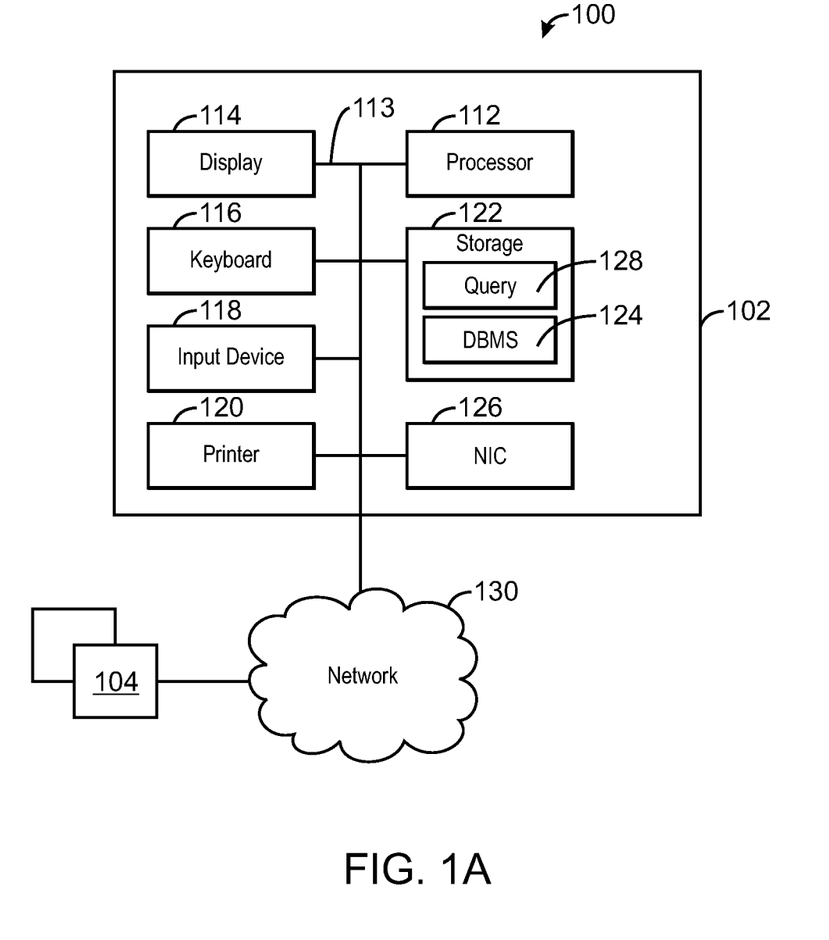
FIG. 1A is a block diagram of a system adapted to optimize a query on a database management system according to an exemplary embodiment of the present invention.

FIG. 1A is a block diagram of a system adapted to optimize a query on a database management system according to an exemplary embodiment of the present invention. The system is generally referred to by the reference number 100. Those of ordinary skill in the art will appreciate that the functional blocks and devices shown in FIG. 1A may comprise hardware elements including circuitry, software elements including computer code stored on a tangible, machine-readable medium or a combination of both hardware and software elements. Additionally, the functional blocks and devices of the system 100 are but one example of functional blocks and devices that may be implemented in an exemplary embodiment of the present invention. Those of ordinary skill in the art would readily be able to define specific functional blocks based on design considerations for a particular electronic device.

The system 100 may include a database server 102, and one or more client computers 104, in communication over a network 130. As illustrated in FIG. 1A, the database server 102 may include a processor 112 which may be connected through a bus 113 to a display 114, a keyboard 116, one or more input devices 118, and an output device, such as a printer 120. The input devices 118 may include devices such as a mouse or touch screen.

The database server 102 may also be connected through the bus 113 to a network interface card (NIC) 126. The NIC 126 may connect the database server 102 to the network 130. The network 130 may be a local area network (LAN), a wide area network (WAN), or another network configuration. The network 130 may include routers, switches, modems, or any other kind of interface device used for interconnection.

Through the network 130, several client computers 104 may connect to the database server 102. The client computers 104 may be similarly structured as the database server 102, with exception to the storage of the DBMS 124. In an exemplary embodiment, the client computers 104 may be used to submit the query 128 to the database server 102 for optimization by the DBMS 124.

The database server 102 may have other units operatively coupled to the processor 112 through the bus 113. These units may include tangible, machine-readable storage media, such as a storage 122. The storage 122 may include media for the long-term storage of operating software and data, such as hard drives. The storage 122 may also include other types of tangible, machine-readable media, such as read-only memory (ROM) and random access memory (RAM). The storage 122 may include the software used in exemplary embodiments of the present techniques.

The storage 122 may include a database management system (DBMS) 124 and a query 128. The DBMS 124 may be a set of computer programs that controls the creation, maintenance, and use of databases by an organization and its end users. The DBMS 124 is described in greater detail with reference to FIG. 1B.

The query 128 may be a relational query language statement for accessing or updating data stored in the DBMS 124. Relational query languages may include any query language configured to access and update data stored in a relational database. In an exemplary embodiment, the relational query language statements may be Structured Query Language (SQL) statements.

The query 128 may include a main query for an outer table and a correlated subquery for an inner table. The main query may include an operation, such as a SELECT operation. The selection of rows from the outer table may be based on two disjunct predicates, one of which may be specified in the subquery. In an exemplary embodiment of the invention, query 128 may include more than two disjunct predicates.

Disjunct predicates may specify separate conditions, whereby a row is selected if the conditions of either predicate are met. For example, the following SQL includes two disjunct predicates:

| SQL STATEMENT 1 |
| --- |
| SELECT R.A FROM R WHERE R.B=1 OR R.C=2 |

In SQL Statement 1, R.A, R.B, and R.C represent columns in a table, R. The two disjunct predicates in SQL Statement 1 are "R.B=1" and "R.C=2." The OR operand may allow rows to be selected from table R under either of multiple conditions. More specifically, using SQL Statement 1, rows from table R may be selected if column B has a value of 1, or if column C has a value of 2. It should be noted that SQL Statement 1 is provided merely to illustrate the concept of disjunct predicates. The SQL Statement 1 is not provided as an example of the query 128.

In an exemplary embodiment of the invention, one or more of the disjunct predicates may include a correlated subquery. The correlated subquery may generate an intermediate result set that may be used to identify rows in the outer table for selection. The correlated subquery may include a correlation predicate that specifies a condition that relates rows from an inner table to rows in the outer table. For example, the following SQL includes a predicate with a correlated subquery:

| SQL STATEMENT 2 |
|---|
| SELECT R.A FROM R WHERE R.B IN (SELECT T.B FROM T WHERE R.C=T.C) |

The correlated subquery in SQL Statement 2 is SELECT T.B FROM T WHERE R.C=T.C. The correlated subquery produces an intermediate result set of rows from table T. The intermediate result set may include values from the column T.B, which may be used to identify rows in table R for selection. More specifically, only rows in table R with column values in R.B that are also found in T.B may be selected.

Further, the correlated subquery of SQL Statement 2 includes a correlation predicate, "R.C=T.C." The correlation predicate may limit the selection of rows in the intermediate result set. In SQL Statement 2, the correlation predicate specifies a condition based on a relationship between the inner table and the outer table. For example, the inner table, T, and the outer table, R, both include a column C. Only the rows in table T where the value of column C matches the value of column C in table R may be selected by the correlated subquery.

Again, it should be noted that SQL Statement 2 is provided merely to illustrate the concept of the correlated subquery, and is not provided as an example of the query 128. Rather, as discussed above, the query 128 may include disjunct predicates and a correlated subquery, such as the following SQL:

| SQL STATEMENT 3 |
|---|
| SELECT R.A FROM R<br>WHERE<br>    R.B IN (SELECT T.B FROM T WHERE R.C=T.C)<br>OR<br>    R.B=1 |

In another exemplary embodiment of the invention, the query 128 may also include an aggregate function. The aggregate function may aggregate, or summarize, column data for all the rows in the correlated subquery. For example, the aggregate function, max( ), determines the row with a highest value for a particular column:

| SQL STATEMENT 4 |
|---|
| SELECT R.A FROM R<br>WHERE<br>    R.B=(SELECT MAX(T.B) FROM T WHERE R.C=T.C)<br>OR<br>    R.B=1 |

In SQL Statement 4, the intermediate result of the correlated subquery may only include the row with the highest value in the column, T.B. It should be noted that the max( ) function is merely one example of an aggregate function. Other aggregate functions may be included in the correlated subquery, such as min( ), count( ), avg( ), and the like. Additionally, the SQL SELECT is merely one example of the query 128. In exemplary embodiments of the invention, any query may be compiled that includes disjunctive predicates and correlated subqueries.

Typically, SQL statements that include disjunctive predicates and correlated subqueries may be performed via an iterative process. In other words, the correlated subquery may be performed for each row scanned in the outer table R.

Figure 1B:
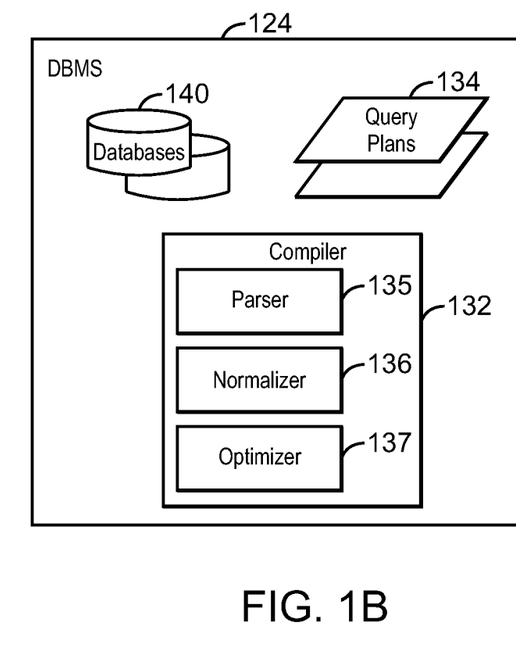
FIG. 1B is a block diagram of a database management system adapted to optimize the query according to an exemplary embodiment of the present invention.

The processing cost for a query performed in this manner may be equal to a factor of r*t input-output (I/O) operations, where r and t represent the number of rows in the tables R and T, respectively. At execution time, such a processing cost may significantly impact the performance of the entire DBMS 124.

In an exemplary embodiment of the invention, the query 128 may be rewritten into an equivalent SQL SELECT statement with the correlated subquery. The equivalent SQL SELECT may produce the same result set as the original query 128. By producing an equivalent SQL SELECT with the correlated subquery removed, the processing cost for producing the same result set may be reduced to a factor of r+t rows, which may represent a significant I/O savings for large values of r and t.

Figure 3A:
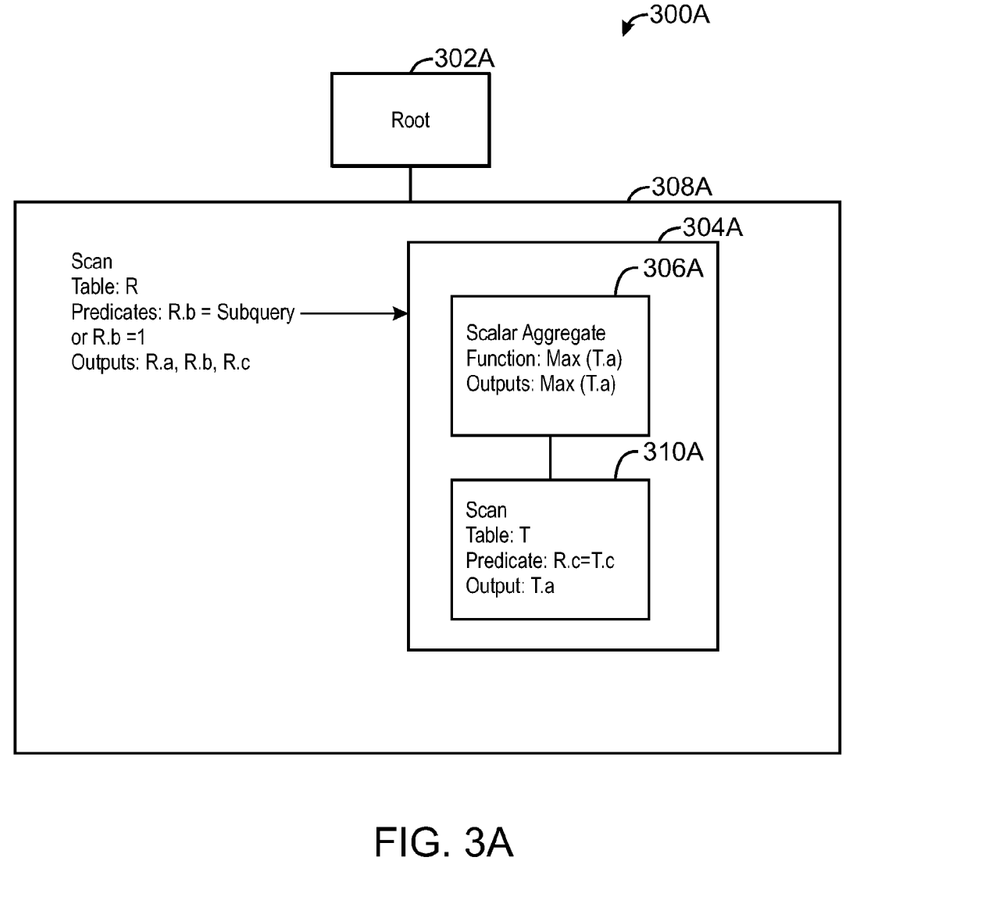
FIG. 3A is a block diagram showing a query tree according to an exemplary embodiment of the present invention.

Advantageously, such a rewrite may be performed regardless of the number of tables being joined, the nature of expressions in the disjunctive predicates, the type of aggregates in the predicates, the depth of the subquery correlation, or the general structure of the query tree 300A.

For example, SQL Statement 4 may be rewritten into the following SQL SELECT statement:

| SQL STATEMENT 5 |
|---|
| SELECT R.A FROM R LEFT JOIN T ON R.C = T.C<br>GROUP BY R.C, R.B, R.A<br>HAVING MAX(T.A) = R.B OR R.B = 1 |

It should be noted that the group by operation may be configured to generate one row for each row in the outer table R. In SQL Statement 5, the R.C column may be used if R.C represents a unique key for each row of table R. The following samples of tables R and T are used to illustrate that SQL Statement 5 generates the same result set as SQL Statement 4.

TABLE 1

| R.A | R.B | R.C |
|---|---|---|
| 1 | 11 | 101 |
| 2 | 12 | 102 |
| 3 | 1 | 103 |

TABLE 2

| T.A | T.C |
|-----|-----|
| 10 | 101 |
| 11 | 102 |
| 11 | 101 |

The result set for SQL Statement 4, given tables R and T as defined in Tables 1 and 2 may be described as follows:

TABLE 3

| R.A |
|-----|
| 1 |
| 3 |

Referring now to SQL Statement 5, the JOIN operation may combine fields from the outer table, R, and inner table, T, by using values common to each, as specified in the correlation predicate (R.C=T.C). More specifically, the LEFT JOIN may perform a left outer join, which may preserve all rows from the outer table for applying the disjunctive predicates. A left outer join as specified in SQL Statement 5 and applied to Tables 1 and 2 may generate the following:

TABLE 4

| R.A | R.B | R.C | T.A | T.C |
|-----|-----|-----|-----|-----|
| 1 | 11 | 101 | 10 | 101 |
| 1 | 11 | 101 | 11 | 101 |
| 2 | 12 | 102 | 11 | 102 |
| 3 | 1 | 103 | NULL | NULL |

The GROUP BY operation may then be performed on the Table 4, using the column R.C. The GROUP BY operation may aggregate over all the column values for the inner table, T, giving the following result:

TABLE 5

| R.A | R.B | R.C |
|-----|-----|-----|
| 1 | 11 | 101 |
| 2 | 12 | 102 |
| 3 | 1 | 103 |

It should be noted that the GROUP BY operation includes a HAVING clause that references the disjunctive predicates, R.B=MAX(T.A), and R.B=1. Because the value of MAX(T.A) for each row in Table 5 may be used to apply the predicates, the following table is provided to show the value of MAX(T.A) for each row in Table 5:

TABLE 6

| R.A | R.B | R.C | MAX(T.A) |
|-----|-----|-----|----------|
| 1 | 11 | 101 | 11 |
| 2 | 12 | 102 | 11 |
| 3 | 1 | 103 | NULL |

The disjunctive predicates may then be applied to Table 6 to provide the final result set of SQL Statement 5. Because the conditions of the disjunctive predicates are only satisfied in row 1 (R.B=MAX(T.A)) and row 3 (R.B=1), SQL Statement 5 may give the following result set:

TABLE 7

| R.A |
|-----|
| 1 |
| 3 |

The result set described in Table 7 is identical to the result set described in Table 3. As such, SQL Statements 4 and 5 may produce the same result set.

FIG. 1B is a block diagram of the DBMS 124 adapted to optimize the query 128 according to an exemplary embodiment of the present invention. As illustrated, the DBMS 124 may include a compiler 132, query plans 134, and several databases 140 against which the query plans 134 may be executed. The databases 140 may include user data organized into tables, rows and columns, typical of a relational DBMS.

The compiler 132 may be software that generates the query plans 134. The compiler 132 may consist of several modules, including, but not limited to, a parser 135, a normalizer 136, and an optimizer 137. Each of the modules may perform a separate phase of query plan generation.

In one phase, the parser 135 may perform syntax checking on the query 128. The parser 135 may also build a query tree, which may be an algebraic tree representation of the query 128.

In another phase, a normalizer 136 may transform the query tree into a form for optimization. The tree generated by the normalizer 136 may represent the query 128 in a form where redundancies in data access may be reduced.

In yet another phase, the optimizer 137 may generate alternative potential query plans to determine the execution strategy for the query 128 based on the query tree in the canonical tree form. The execution strategy may be the query plan 134.

Figure 2:
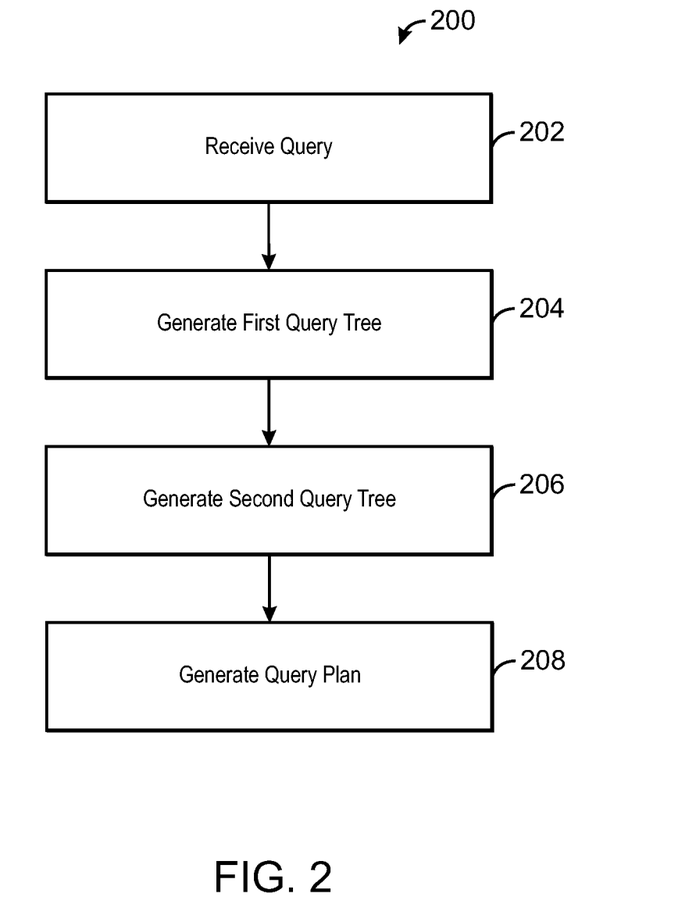
FIG. 2 is a process flow diagram showing a computer-implemented method for optimizing the query according to an exemplary embodiment of the present invention.

FIG. 2 is a process flow diagram showing a computer-implemented method for optimizing the query 128 according to an exemplary embodiment of the present invention. The method is generally referred to by the reference number 200, and may be performed by the compiler 132. For the purpose of illustration, the method 200 is described in the context of a compilation of SQL Statement 4. It should be understood that the process flow diagram is not intended to indicate a particular order of execution.

The method may begin at block 202. At block 202, the compiler 132 may receive the query 128 from the client computer 104. At block 204, the compiler 132 may generate a query tree that represents the query 128.

FIG. 3A illustrates a query tree 300A according to an exemplary embodiment of the present invention. The query tree 300A may represent SQL Statement 4. The query tree 300A may include 2 nodes, a root node 302A, and a scan node 308A.

The scan node 308A may identify a table to be scanned: the outer table R; predicates: R.B=<subquery>, and R.B=1; and, the outputs of the scan: columns R.A, R. B, and R.C. It should be noted that the predicates identified in the scan node 308A may include the disjunct predicates of SQL Statement 4.

As one of the disjunct predicates may include the correlated subquery, the scan node 308A may also include a subquery tree 304A. As shown, the subquery tree 304A may include a scalar node 306A, and a scan node 310A.

The scalar node 306A may identify the aggregate function of the correlated subquery: MAX(T.A). Positioned below the scalar node 306A, the scan node 310A may identify the table to be scanned: the inner table T; a predicate: R.C=T.C; and, the output of the scan: column T.A. It should be noted that the predicate identified in the scan node 310A may be the correlation predicate of SQL Statement 4.

The query trees 300A and 304A may be upward propagating, meaning that the operations may be performed from the bottom up. As shown in FIG. 3A, the scalar node 306A is positioned above the scan node 310A. As such, the structure of the subquery tree 304A may indicate that the scan of table T is performed before the aggregate function MAX( ) is applied to the output of the scan operation.

Further, the inclusion of the subquery tree 304A within the scan node 308A may indicate that the correlated subquery is performed iteratively. As stated previously, the iteration may incur a significant processing cost.

Figure 3B:
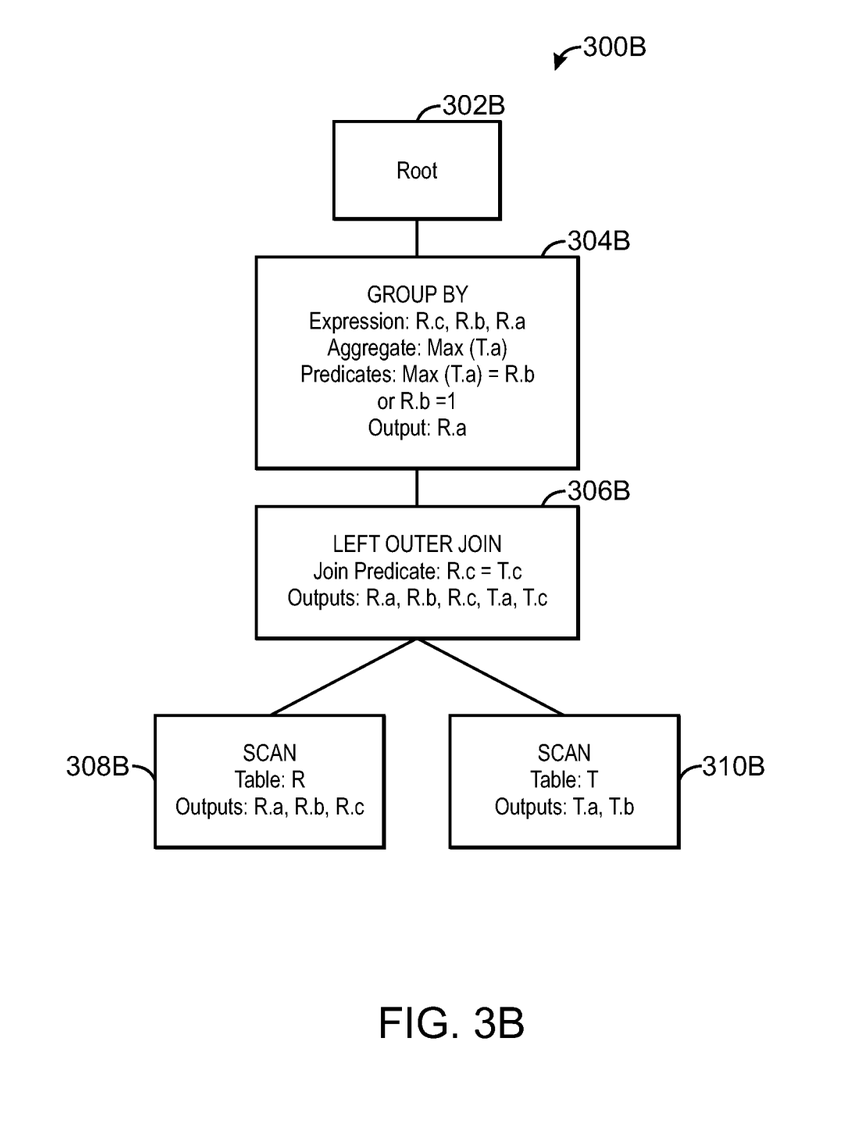
FIG. 3B is a block diagram showing a query tree according to an exemplary embodiment of the present invention.

To create a query plan 134 with a reduced processing cost, at block 206, a second query tree 300B may be generated. The query tree 300B may represent an SQL statement equivalent to the original query 128. As stated previously, the equivalent SQL statement may generate the same result set as the original query 128.

FIG. 3B illustrates the query tree 300B according to an exemplary embodiment of the present invention. The query tree 300B may represent SQL Statement 5, which as stated previously, may be equivalent to SQL Statement 4.

The query tree 300B may include a root node 302B, a group by node 304B, a left outer join node 306B, and two scan nodes 308B and 310B. As stated previously, the structure of the query tree 300B may indicate the order of operations. As such, the query tree 300B is described below in the same sequence in which the operations may be performed.

The scan nodes 308B and 310B may identify the tables to be scanned, R and T, and their respective outputs. The outputs of the scans, R.A, R.B, R.C, T.A, and T.C, may be input to the join operation described by the left outer join node 306B.

The left outer join node 306B may identify a join predicate: R.C=T.C. It should be noted that the join predicate may be the correlation predicate of SQL Statement 4. The left join node 306B may also identify the outputs of the left outer join operation, which are the same as those of the scan operations.

The group by node 304B may identify an expression, aggregate function, predicates, and output. The expression may enable the group by operation to generate one row for each row in the outer table R. As shown, the expression, R.C, is a column from the outer table. In an exemplary embodiment of the invention, the column, R.C, may be a unique key for the outer table. It should be noted that the expression may include multiple columns.

At block 208, the query plan 134 may be generated. The query plan 134 may be based on the query tree 300B. Because the query tree 300B does not include iterative or nested joins, the query plan 134 may be executed with a processing cost savings over the query tree 300A for the original query 128.

Figure 4:
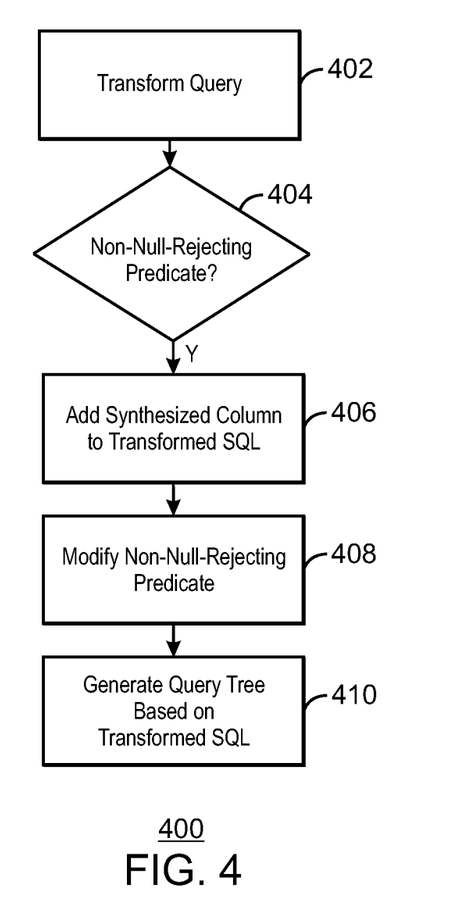
FIG. 4 is a process flow diagram showing a computer-implemented method for optimizing the query according to an exemplary embodiment of the present invention.

FIG. 4 is a process flow diagram showing a computer-implemented method for generating a query tree according to an exemplary embodiment of the present invention. The method is generally referred to by the reference number 400, and may be performed by the compiler 132. It should be understood that the process flow diagram is not intended to indicate a particular order of execution.

The method begins at block 402. At block 402, the query 128 may be rewritten into an equivalent SQL statement. The equivalent SQL statement may generate the same result set as the original query 128.

In an exemplary embodiment of the invention, the correlated subquery of the original query 128 may be removed, and replaced with a LEFT JOIN operation. The LEFT JOIN may use the correlation predicate to join the inner and outer tables.

In an exemplary embodiment of the invention, the query 128 may include correlated subquery predicates on both sides of the disjunction. For example, the following SQL:

| SQL STATEMENT 6 |
|---|
| SELECT R.A FROM R<br>WHERE<br>    R.B=(SELECT MAX(T1.B) FROM T1 WHERE<br>    R.C=T1.C)<br>OR<br>    R.B=(SELECT MIN(T2.B) FROM T2 WHERE<br>    R.C=T2.C) | may be transformed to the following SQL:

| SQL STATEMENT 7 |
|---|
| SELECT R.A FROM<br>    (SELECT R.A, R.B, R.C, MAX (T1.B) AS MAXT1B FROM R<br>    LEFT JOIN T1 ON R.C = T1.C GROUP BY R.C, R.B, R.A)<br>LEFT JOIN T2 ON R.C = T2.C<br>GROUP BY R.C, R.B, R.A HAVING R.B = MAXT1B OR R.B = MIN (T2.B) |

The LEFT JOIN preserves the rows of the outer table for later application of the disjunctive predicates. Significantly, the LEFT JOIN may introduce NULL values for the LEFT JOIN result where there is no correlating row in the inner table for a row of the outer table.

NULL values produced in this way may not have been produced by the original subquery. As such, the transformed query may be further modified to maintain equivalence between the original query 128 and the transformed query. More specifically, at block 404, it may be determined whether the query 128 includes a non-null-rejecting predicate. A non-null-rejecting predicate is best described in terms of a null-rejecting predicate. A null-rejecting predicate may be a predicate that is always FALSE for null data values. For example, the comparison T.A=5 may be a null-rejecting predicate because the result of the comparison when the value of T.A is NULL, is FALSE.

A predicate may be determined to be null-rejecting based on an aggregate function or constraint in the predicate. For example, the aggregate function COUNT( ) when used with a column wildcard is not null-rejecting. As such, the aggregate function COUNT(T.*) may return a value equal to the total number of rows in the table T, even rows consisting entirely of NULL values.

In contrast, the aggregate function COUNT( ) may be null rejecting when used without the wildcard character. For example, the aggregate function COUNT(T.A) may return a value equal to the number of rows in the table T that only have non-NULL values for column T.A. The NOT IN and NOT EXISTS constraints are examples of constraints that may not be null-rejecting.

Null-rejecting predicates may be useful because the null-rejecting predicate may always return a value of FALSE for NULL values in the inner table introduced by the LEFT JOIN as described above.

However, for predicates that are not null-rejecting, comparisons may be made in the transformed query that would not have been performed in the original query 128. As such, the transformed query may not be equivalent to the original query 128. By identifying predicates that are not null-rejecting, an additional transformation may be made to preserve equivalence between the original query 128 and the transformed query.

Accordingly, if the query 128 includes a non-null-rejecting predicate, at block 406, a synthesized column may be added to the transformed SQL. More specifically, the synthesized column may be added to the output of the LEFT JOIN. The additional column may be a logical data type with a TRUE value for all rows that would have been produced by the subquery, and a FALSE value for all rows introduced by the lack of a correlation between the inner and outer table.

Additionally, at block 408, the non-null-rejecting predicate may be modified. More specifically, the synthesized column may be conjoined with the non-null-rejecting predicate to ensure that any comparisons to NULL values introduced as described above may return a FALSE condition. For example, the following SQL includes a non-null rejecting predicate:

| SQL STATEMENT 8 |
| --- |
| SELECT R.A FROM R<br>WHERE R.B = (SELECT COUNT(T.*) FROM T<br>    WHERE R.C = T.C)<br>OR R.B = 1 |

SQL Statement 8 may be transformed into the following equivalent form. The following SQL references TR.SYNTH, which may be the synthesized column described above.

| SQL STATEMENT 9 |
| --- |
| SELECT R.A FROM R LEFT JOIN T ON R.C = T.C<br>GROUP BY R.C, R.B, R.A, TR.SYNTH<br>HAVING ((COUNT T.*)= R.B AND TR.SYNTH)<br>OR R.B = 1 |

The method 400 may then flow to block 410. Similarly, if the query 128 does not include a non-null-rejecting predicate, the method may flow to block 410. At block 410, the query tree may be generated based on the transformed SQL.

Figure 5:
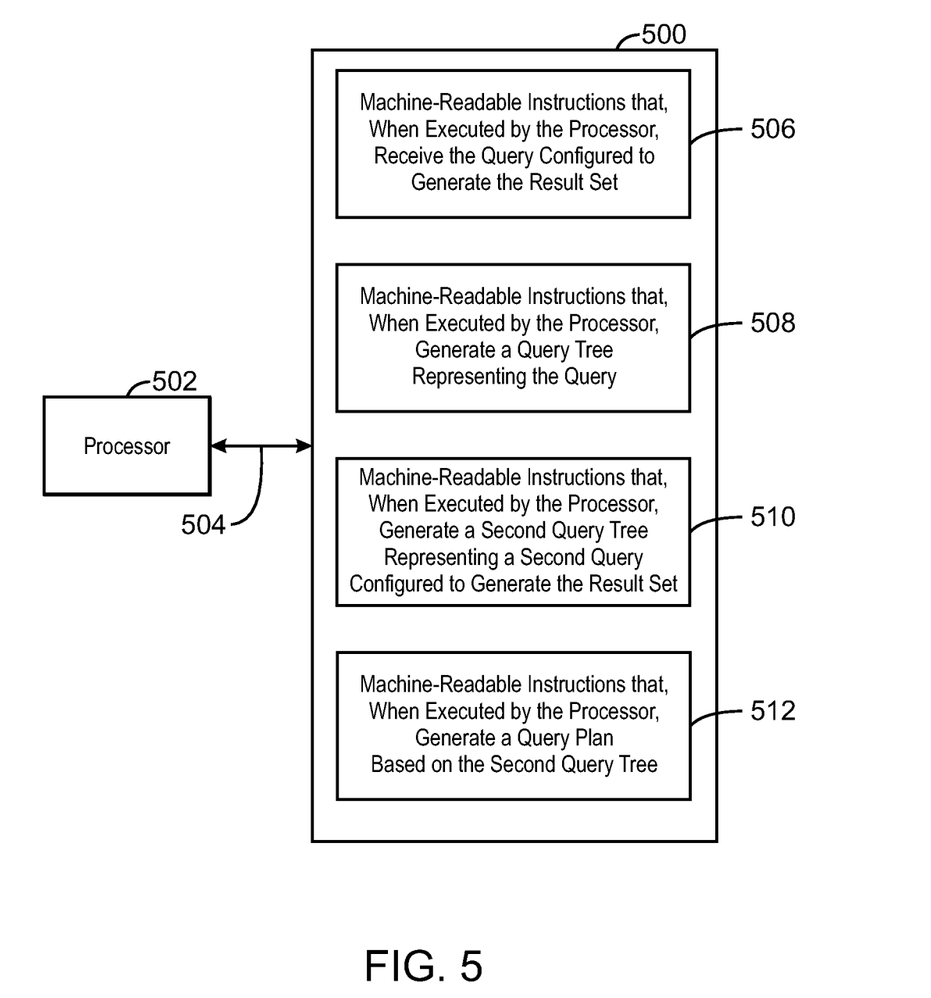
FIG. 5 is a block diagram showing a tangible, machine-readable medium that stores code adapted to optimize the query according to an exemplary embodiment of the present invention.

FIG. 5 is a block diagram showing a tangible, machine-readable medium that stores code adapted to facilitate optimizing the query 128 according to an exemplary embodiment of the present invention. The tangible, machine-readable medium is generally referred to by the reference number 500. The tangible, machine-readable medium 500 may correspond to any typical storage device that stores computer-implemented instructions, such as programming code or the like. Moreover, tangible, machine-readable medium 500 may be included in the storage 122 shown in FIG. 1. When read and executed by a processor 502, the instructions stored on the tangible, machine-readable medium 500 are adapted to cause the processor 502 to optimize the query 128.

A region 506 of the tangible, machine-readable medium 500 stores machine-readable instructions that, when executed by the processor 502, receive the query 128 configured to generate the result set.

A region 508 of the tangible, machine-readable medium 500 stores machine-readable instructions that, when executed by the processor 502, generate a query tree representing the query 128.

A region 510 of the tangible, machine-readable medium 500 stores machine-readable instructions that, when executed by the processor 502, generate a second query tree representing a second query configured to generate the result set.

A region 512 of the tangible, machine-readable medium 500 stores machine-readable instructions that, when executed by the processor 502, generate a query plan based on the second query tree.

What is claimed is:

1. A computer-implemented method of optimizing a query, comprising:
   receiving a first query configured to generate a result set, wherein the first query comprises an operation for an outer table, a first predicate, and a second predicate comprising a subquery correlating an inner table to the outer table, wherein the first predicate and the second predicate are disjunctive, wherein the subquery comprises an operation for the inner table and a correlation predicate correlating the inner table and the outer table, and wherein the second query comprises a left outer join operation between the inner table and the outer table using the correlation predicate;
   generating a first query tree representing the first query;
   generating a second query tree representing a second query configured to generate the result set, wherein the second query does not comprise the subquery, and wherein the second query comprises a group by operation configured to generate one row for each row in the outer table, and wherein the group by operation comprises a having clause comprising the first predicate and the second predicate; and
   generating a query plan based on the second query tree.

2. The method recited in claim 1 wherein generating the second query tree comprises removing the subquery from the second predicate, and wherein the second query tree comprises the operation, the first predicate, and the second predicate.

3. The method recited in claim 1, wherein the one row comprises a null value for the inner table, and wherein the second predicate is not null-rejecting.

4. The method recited in claim 3, wherein the second predicate comprises an aggregate function that is not null-rejecting.

5. The method recited in claim 4, wherein the aggregate function is a count operation comprising a column wildcard.

6. The method recited in claim 3, wherein the second predicate comprises a constraint that is not null-rejecting.

7. The method recited in claim 1, wherein the query plan comprises an operation with a processing cost at a factor of a number of rows in the outer table plus a number of rows in the inner table.

8. The method recited in claim 3, wherein the having clause comprises a third predicate that is conjunctive with the second predicate, wherein the third predicate comprises a FALSE value when the null value results from a non-correlated row between the inner table and the outer table.

9. A computer system for optimizing a query in a database management system (DBMS), the computer system comprising:
   a processor that is adapted to execute stored instructions; and
   a memory device that stores instructions, the memory device comprising:
      computer-implemented code adapted to receive a first query configured to generate a result set, wherein the query comprises an operation for an outer table, a first predicate, and a second predicate, wherein the first predicate comprises a first subquery correlating an inner table to the outer table, wherein the first predicate and the second predicate are disjunctive, wherein the first subquery comprises an operation for the inner table and a correlation predicate correlating the inner table and the outer table, and wherein the second query comprises a left outer join operation between the inner table and the outer table using the correlation predicate;

computer-implemented code adapted to generate a first query tree representing the first query;

computer-implemented code adapted to generate a second query tree representing a second query configured to generate the result set, wherein the second query does not comprise the first subquery, and wherein the second query comprises a group by operation configured to generate one row for each row in the outer table, and wherein the group by operation comprises a having clause comprising the first predicate and the second predicate; and computer-implemented code adapted to generate a query plan based on the second query tree.

10. The computer system recited in claim 9, wherein the query plan comprises an operation with a processing cost at a factor of a number of rows in the outer table plus a number of rows in the inner table.

11. The computer system recited in claim 9, wherein the computer-implemented code adapted to generate the second query tree comprises computer-implemented code adapted to remove the first subquery from the second predicate, and wherein the second query tree comprises the operation, the first predicate, and the second predicate.

12. The computer system recited in claim 9, wherein the one row comprises a null value for the inner table, and wherein the second predicate is not null-rejecting.

13. The computer system recited in claim 12, wherein the having clause comprises a third predicate that is conjunctive with the second predicate, wherein the third predicate comprises a FALSE value when the null value results from a non-correlated row between the inner table and the outer table.

14. A non-transitory machine-readable medium that stores machine-readable instructions executable by a processor to optimize a query in a database management system (DBMS), the tangible, machine-readable medium comprising:

machine-readable instructions that, when executed by the processor, receive a first query configured to generate a result set, wherein the first query comprises an operation for an outer table, a first predicate, and a second predicate comprising a subquery correlated to the operation, wherein the first predicate and the second predicate are disjunctive, wherein the subquery comprises an operation for the inner table and a correlation predicate correlating the inner table and the outer table, and wherein the second query comprises a left outer join operation between the inner table and the outer table using the correlation predicate;

machine-readable instructions that, when executed by the processor, generate a first query tree representing the first query;

machine-readable instructions that, when executed by the processor, generate a second query tree representing a second query configured to generate the result set, wherein the second query does not comprise the subquery, and wherein the second query comprises a group by operation configured to generate one row for each row in the outer table, and wherein the group by operation comprises a having clause comprising the first predicate and the second predicate; and machine-readable instructions that, when executed by the processor, generate a query plan based on the second query tree.

15. The non-transitory machine-readable medium recited in claim 14, wherein the one row comprises a null value for an inner table of the first query, and wherein the second predicate is not null-rejecting.

16. The non-transitory machine-readable medium recited in claim 15, wherein the having clause comprises a third predicate that is conjunctive with the second predicate, wherein the third predicate comprises a FALSE value when the null value results from a non-correlated row between an inner table of the first query and an outer table of the first query.

17. The non-transitory machine-readable medium recited in claim 14, wherein the machine-readable instructions that generate the second query tree comprise machine-readable instructions that, when executed by the processor, remove the subquery from the second predicate, wherein the second query tree comprises the operation, the first predicate, and the second predicate.

18. The non-transitory machine-readable medium recited in claim 14, wherein the query plan comprises an operation with a processing cost at a factor of a number of rows of the outer table of the first query plus a number of rows of an inner table of the first query.

* * * * *